(12) United States Patent
Kraft et al.

(10) Patent No.: US 7,636,548 B2
(45) Date of Patent: Dec. 22, 2009

(54) EVENT HANDLING IN A MOBILE TERMINAL

(75) Inventors: Christian Kraft, Frederiksberg C (DK); Peter Dam Nielsen, Lyngby (DK)

(73) Assignee: Nokia Corporation, Espoo, FL (US)

( * ) Notice: Subject to any disclaimer, the term of this patent is extended or adjusted under 35 U.S.C. 154(b) by 572 days.

(21) Appl. No.: 11/073,407

(22) Filed: Mar. 4, 2005

(65) Prior Publication Data
US 2006/0199535 A1 Sep. 7, 2006

(51) Int. Cl.
*H04B 7/00* (2006.01)
(52) U.S. Cl. ............... 455/41.2; 455/456.1; 455/456.3; 455/456.6; 370/328; 370/338
(58) Field of Classification Search ........... 455/41.2, 455/456.1, 456.3, 456.6, 567; 370/328, 338
See application file for complete search history.

(56) References Cited

U.S. PATENT DOCUMENTS

| | | | | |
|---|---|---|---|---|
| 5,497,372 | A | * | 3/1996 | Nankoh et al. ............ 370/480 |
| 7,212,827 | B1 | * | 5/2007 | Veschl .................... 455/456.1 |
| 2002/0052225 | A1 | | 5/2002 | Davis et al. |
| 2002/0090931 | A1 | * | 7/2002 | Papineau et al. ............ 455/411 |
| 2003/0085766 | A1 | * | 5/2003 | Rogerson ................... 331/57 |
| 2005/0075096 | A1 | * | 4/2005 | Aljuraid .................. 455/414.1 |
| 2006/0074497 | A1 | * | 4/2006 | Pollin ....................... 700/14 |

FOREIGN PATENT DOCUMENTS

| | | |
|---|---|---|
| EP | 1111884 A2 | 6/2001 |
| EP | 1241853 A2 | 9/2002 |
| EP | 1349049 A1 | 10/2003 |
| EP | 1355468 A1 | 10/2003 |

OTHER PUBLICATIONS

"User's Manual for Nokia 9110 Communicator", Issue 3 EN, 1999, 190 pages.
"Nokia 9210 Communicator User's Guide", Issue 3, 2001, 276 pages.
"Nokia 9300 User Guide", Issue 1, 2004, 99 pages.
"Nokia 9500 Communicator User Guide", Issue 2, 2004, 105 pages.
European Office Action dated Mar. 26, 2008.
International Search Report dated Jun. 29, 2006.

* cited by examiner

*Primary Examiner*—Tuan A Pham
(74) *Attorney, Agent, or Firm*—Perman & Green LLP

(57) ABSTRACT

A method for triggering an event in a mobile communication terminal, where the terminal is capable of operating in any one of a plurality of selectable states, the method comprises the steps of: receiving scheduling information when the terminal is in a first operational state, the information specifying that an event in the mobile terminal is to be scheduled to be triggered when the mobile communication terminal has transitioned to a second state.

18 Claims, 3 Drawing Sheets

EVENT HANDLING IN A MOBILE TERMINAL

TECHNICAL FIELD

The present invention relates to a method and mobile communication terminal to control the triggering of events in a mobile communication terminal.

BACKGROUND

Mobile communication terminals have changed dramatically in the last decade. With the first 2 G terminals, the only real purpose was to make normal phone calls. Now with 2.5 G (GPRS), CDMA2000 and UMTS technology, coupled with software applications such as a calendar application, a contact list application and a task list application, the mobile communication terminals have evolved to take on the role of being PDAs (Personal Digital Assistant), in addition to being communication devices.

A problem found with using the mobile communication terminal as a PDA is that radio traffic generated from a mobile communication terminal may be prohibited in some situations, such as in hospital environments and while flying on airplanes. This has been solved with what is called 'flight mode', which is known in the art. Flight mode implies that transmission and reception of radio signals in addition to software components requiring radio interfaces are disabled, while software components that do not use any radio interfaces are still available to the user. For example, in flight mode it is not possible to make phone calls, but the calendar application is available. Consequently, while in flight mode, the terminal is safe to operate while the user is located on an airplane in flight or in a hospital environment.

One problem occurs when the user exits flight mode, e.g. when returning to ground again after having been on an airplane or when exiting a hospital environment and the user wishes to set the terminal to be in normal operation mode. At this point in time, the user is typically busy with several activities, such as disembarking the plane, finding where to exit the airport or to catch another plane, etc. Thus for the user to make desired changes in the mobile communication terminal for the new location is stressful and easily forgotten until a later, less optimal, time.

If a call reminder were to go off while the user is on a plane or somewhere else where the user is unable to make the call in the reminder, the user would then be forced to wait until he is allowed to switch on the RF components again. As some time could pass before the terminal is allowed to use the RF components again and when it happens the user might be preoccupied with other tasks the user might forget that he was supposed to make a call and the reminder will then have been to no use.

Another reason for a user desiring, or even being compelled, to temporarily disable radio communication is that of integrity and security while using short range RF. For example, when using a Bluetooth® transceiver in the mobile communication terminal to send or receive data, it may be desired for security reasons to first check if there are any untrusted Bluetooth® devices within range, and only proceed with the transfer if no untrusted devices are found. This procedure can be both time consuming and irritating for the user.

SUMMARY OF THE INVENTION

An object of the present invention is to alleviate problems a user faces when using a mobile communication terminal as described above.

The object is achieved in a first aspect by a method for triggering an event in a mobile communication terminal, where the terminal is capable of operating in any one of a plurality of selectable states. The method comprises the steps of: receiving scheduling information when the terminal is in a first operational state, the information specifying that an event in the mobile terminal is to be scheduled to be triggered when the mobile communication terminal has entered a second state. The event is triggered when the mobile communication terminal has entered the second operational state. In this way, the user can schedule events when he or she has a lot of time, for execution at a time when he or she knows that many activities need to be performed simultaneously.

In a preferred embodiment of the invention, the first operational state is when the terminal is radio silent. This covers the case for when the terminal is in flight mode.

In a preferred embodiment of the invention, the second operational state is a normal mode. Normal mode is when the terminal returns to a normal operational mode e.g. when it is capable of receiving and transmitting a call after having been in another mode, such as flight mode. This is a typical example of when it is useful for the end user to have previously scheduled events triggered.

In a preferred embodiment of the invention, the first operational state is when at least one untrusted short range RF device is within range for a short range RF transceiver in the terminal. The second state is when only trusted short range RF devices are within range for the short range RF transceiver. In other words, events can be scheduled to be executed once the security risks of having untrusted devices in the proximity have diminished.

In a preferred embodiment of the invention, the short range RF transceiver is a Bluetooth® transceiver and the short range RF device is a Bluetooth® device. Bluetooth® is one of the most commonly used short range RF technologies.

In a preferred embodiment of the invention, the event is a transfer of data to or from the terminal. Thus the user can easily schedule the transfer of data for when no untrusted devices are in the proximity, enhancing the security of such transfer.

In a preferred embodiment of the invention, the event is activation of a reminder. For example, a user may wish to be reminded to call relatives once the user is out of the hospital.

In a preferred embodiment of the invention, the event is to synchronize a clock in the terminal with timing information available in a mobile communication network to which the terminal connects to when entering the second state. This can be advantageous for example after having traveled a great distance and landing in a new time zone, ensuring that the clock in the terminal is set to the correct local time.

In a preferred embodiment of the invention, the event is to scan and store available broadcast radio stations. Again, this can with advantage be used when stepping off a plane in a new location, allowing a set of broadcast radio stations to be easily available to the user.

Another aspect of the present invention is a mobile communication terminal comprising a processor and memory configured to perform the method described above and providing the same advantages as described above.

The following is a description of two use cases to illustrate the usefulness of the invention.

The first use case is when a user gets a reminder to make a call while in flightmode. As it is not allowed to start up the RF part of the device he is unable to make the call and thus the reminder is redundant at this point and might only serve as a distraction and stress the user. According to the present invention, the terminal would automatically check whether it is possible to perform the required action ie to make the phone call and if it is not possible the action is postponed to a later time. This could either be done by simply postponing the reminder or by associating it with a profile change going from Flightmode to another mode allowing RF activity or when contact with an operator has been established.

Alternatively, postponing the action could be supplemented with keeping the original reminder as well. In the use case above, this would result in both a reminder going of while in flight mode and one going off as contact with an operator has been established. This would allow the user to look for alternative modes of communication such as airplane phones while still being certain that should he fail he will be reminded again when it is possible.

The second use case is when a terminal has a scheduled Bluetooth™ synchronize session or when a user initiates a synchronization. The terminal would then sense if there are any unfriendly device around, ie any devices that are not on the trusted list, any unknown devices or any devices on a blacklist depending on the desired security. If so, the terminal automatically postpones the synchronization to a later time when there are only friendly devices around either by postponing and trying again or by monitoring the environment and initiating the synchronization when the criteria is fulfilled.

BRIEF DESCRIPTION OF THE DRAWINGS

The present invention will be more apparent from the accompanying drawings, provided as non-limiting examples.

PREFERRED EMBODIMENTS

Figure 1:
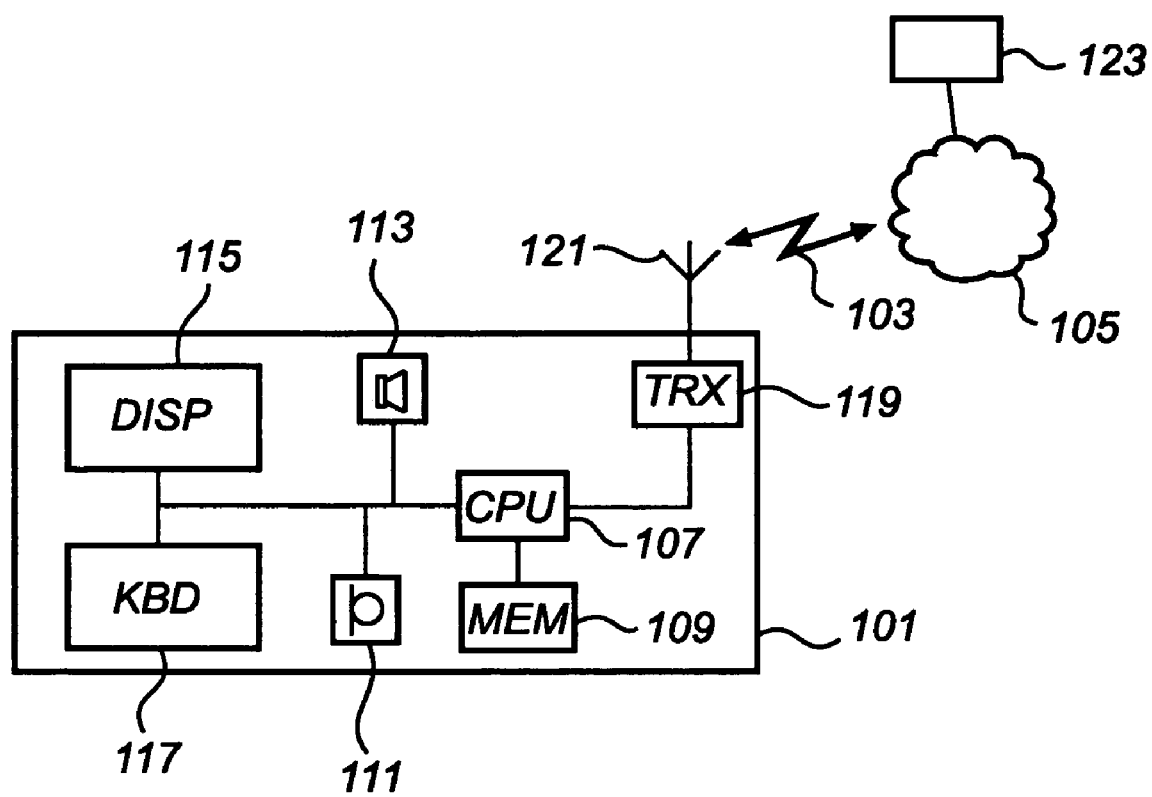
FIG. 1 schematically illustrates a functional block diagram of a mobile communication terminal according to an embodiment of the present invention.

FIG. 1 illustrates schematically a communication terminal 101 in which the present invention is implemented. The terminal 101 is capable of communication via an air interface 103 with a radio communication network 105 such as the well known systems CDMA2000, D-AMPS, GSM, UMTS, EDGE, etc. The terminal comprises a processor 107, memory 109 as well as input/output units in the form of a microphone 111, a speaker 113, a display 115 and a keyboard 117. Radio communication is realized by radio circuitry 119 and an antenna 121. Connected to the radio communication network 105 is a controller 123. The details regarding how these units communicate are known to a person skilled in the art and is therefore not discussed further.

Figure 2:
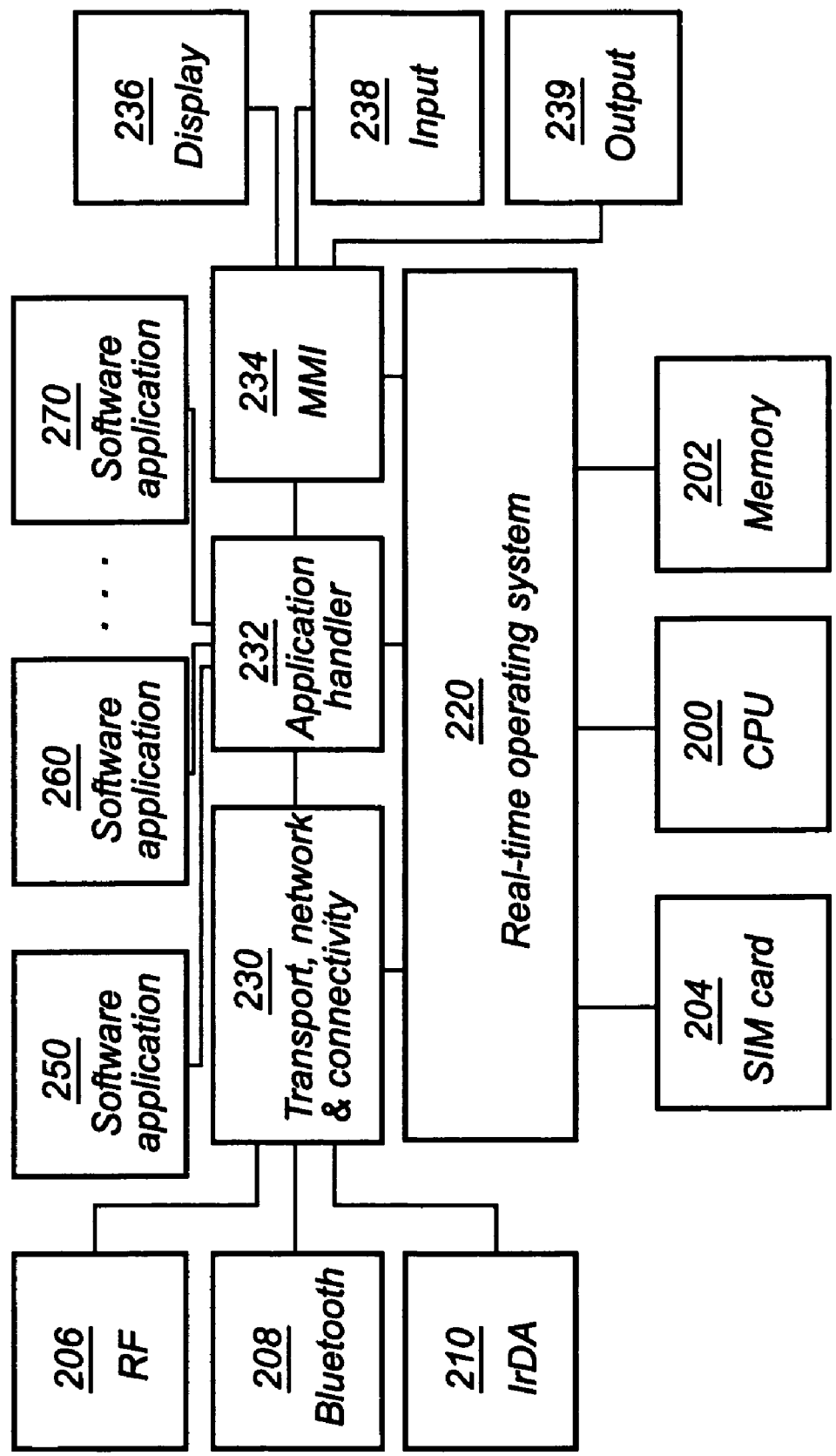
FIG. 2 schematically illustrates a block diagram representing the general internal component and software structure of a mobile communication terminal according to an embodiment of the present invention.

The internal component and software structure of a mobile communication terminal according to an embodiment of the present invention will now be described with reference to FIG. 2. The mobile terminal has a controller 200 which is responsible for the overall operation of the mobile terminal and is preferably implemented by any commercially available CPU ("Central Processing Unit"), DSP ("Digital Signal Processor") or any other electronic programmable logic device. The controller 200 has associated electronic memory 202 such as RAM memory, ROM memory, EEPROM memory, flash memory, or any combination thereof. The memory 202 is used for various purposes by the controller 200, one of them being for storing data and program instructions for various software in the mobile terminal. The software includes a real-time operating system 220, man-machine interface (MMI) drivers 234, an application handler 232 as well as various applications 250, 260, 270. The applications 250, 260, 270 may include a call handling application as well as various other application, such as a contacts (phonebook) application, a messaging application, a calendar application, a control panel application, a camera application, a media player, one or more video games, a notepad application, etc, including software capable of performing a method according to the invention as described below in connection with FIG. 3.

The MMI drivers 234 cooperate with the or each display 236 as well as various other I/O devices 238, 239 such as a microphone, a speaker, a vibrator, a keypad, a ringtone generator, a LED indicator, volume controls, etc. As is commonly known, a user may operate the mobile terminal through the man-machine interface thus formed.

The software also includes various modules, protocol stacks, drivers, etc., which are commonly designated as a software block 230 and which provide communication services (such as transport, network and connectivity) for an RF interface 206, and optionally a Bluetooth® interface 208 and/or an IrDA interface 210. The RF interface 206 comprises an internal or external antenna as well as appropriate radio circuitry for establishing and maintaining a wireless link to a base station in a mobile communication network. As is well known to a person skilled in the art, the radio circuitry comprises a series of analog and digital electronic components, together forming a radio receiver and transmitter.

The mobile terminal also has a SIM card 204 and an associated reader. As is commonly known, the SIM card 204 comprises a processor as well as local work and data memory.

Figure 3:
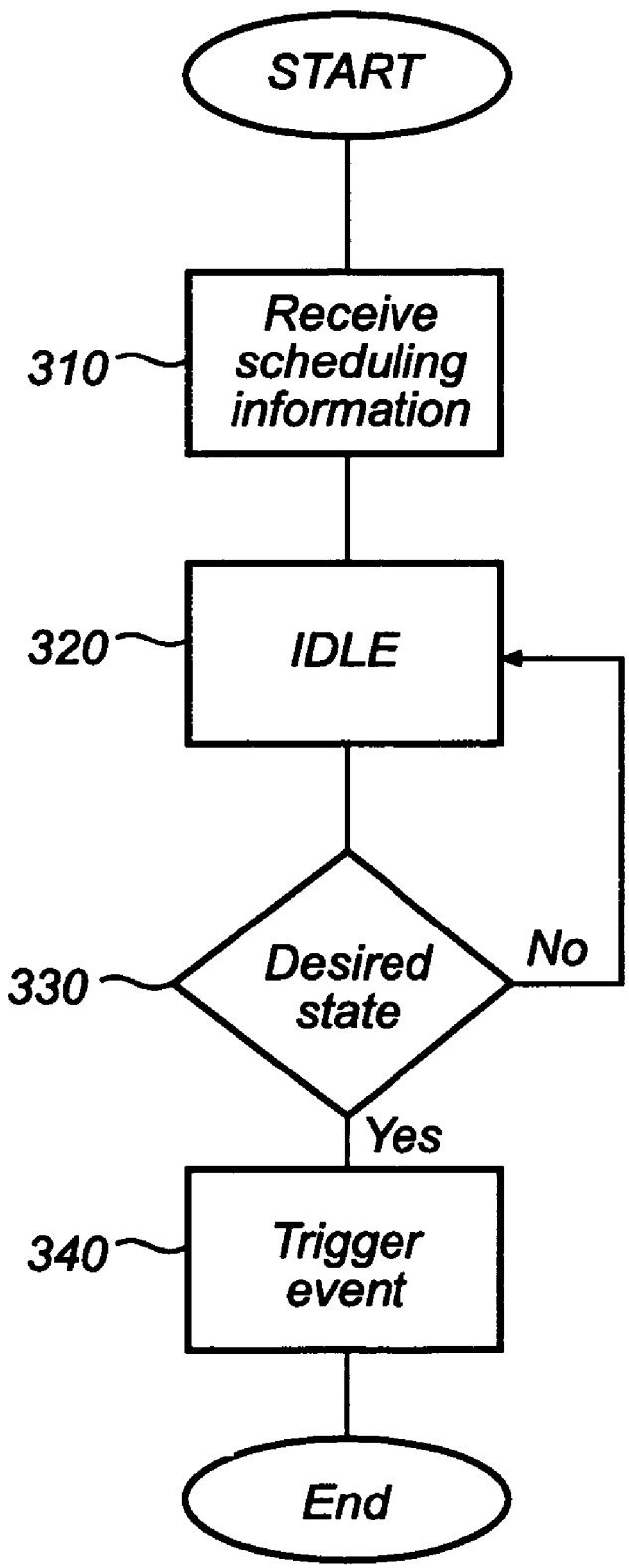
FIG. 3 is a flowchart of a method according to an embodiment of the present invention.

FIG. 3 shows a flowchart of a method according to an embodiment of the present invention. The execution of the steps illustrated is preferably executed in a terminal such as described above without continuous exclusive use of the controller (e.g. 200 in FIG. 2). Consequently, several software programs or modules can share use of the controller. Such execution is well known in the art and is often referred to as multitasking.

In a receive scheduling information step 310, the terminal receives information to schedule an event to be triggered in the future. Included in this information is an event to be triggered and a desired state the terminal should have transitioned to when triggering the event. This information is preferably entered by the user, but could also be provided in other ways, such as in a received data message, such as an SMS or an MMS received over the air.

Non-limiting examples of events that may be scheduled in step 310 are: a reminder with a user specified text, a synchronization of the terminal clock with a time available in the network, a search and store of available local broadcast radio stations.

In an idle state 320, the execution flow temporarily rests allowing other software modules in the terminal to execute before executing the next step.

In a desired state step 330, it is determined whether the current state of the terminal corresponds to the desired state. If the terminal is in the desired state, the execution flow continues to step 340, otherwise the execution flow goes back to step 320. The determination is performed, as the skilled person will realize, by interaction with other software or hardware components in the terminal having information about what operational state the terminal is presently in.

In a trigger event step 340, the event specified in step 310 is triggered. The action and result of the triggering is, as the skilled person will realize, performed with interaction with other software and hardware components in the terminal. This may result, for example, in visual output on the display, sound output to the speaker or a change in information in another software module.

While the execution described above only refers to one scheduled event, it is within the scope of present invention to schedule any number of events. On any state transition, any event or events associated with the new state will be triggered.

As a person skilled in the art will realize, the claimed invention could just as well be achieved if the event is triggered when carrying out a transition to the desired state itself. In other words, in stead of periodically having to check if the terminal is in the desired state, the transition itself could trigger any scheduled events.

The invention claimed is:

1. A method comprising:
    receiving scheduling information in a mobile communication terminal when said terminal is in a first operational state, said information specifying that an event in said mobile terminal is to be scheduled to be triggered when said mobile communication terminal has entered a second operational state, and
    triggering said event when said mobile communication terminal has entered said second operational state wherein said first operational state is when at least one untrusted short range RF device is within range for a short range RF transceiver in said terminal, and said second operational state is when only trusted short range RF devices are within range for said short range RF transceiver.

2. The method according to claim 1, wherein said first operational state is when said terminal is radio silent.

3. The method according to claim 1, wherein said second state is a normal operational mode.

4. The method according to claim 1, wherein said short range RF transceiver is a Bluetooth® transceiver and said short range RF device is a Bluetooth® device.

5. The method according to claim 1, wherein said event is a transfer of data to or from said terminal.

6. The method according to claim 1, wherein said event is activation of a reminder.

7. The method according to claim 1, wherein said event is to synchronize a clock in said terminal with timing information available in a mobile communication network to which said terminal connects to when entering said second operational state.

8. The method according to claim 1, wherein said event is to scan and store available broadcast radio stations.

9. A mobile communication terminal comprising:
    a processor; and
    a memory
    where the processor and memory are configured to
    receive scheduling information when said terminal is in a first operational state, said information specifying that an event in said mobile terminal is to be scheduled to be triggered when said mobile communication terminal has entered a second operational state, and
    trigger said event when said mobile communication terminal has entered said second operational state wherein said first operational state is when at least one untrusted short range RF device is within range for a short range RF transceiver in said terminal, and said second operational state is when only trusted short range RF devices are within range for said short range RF transceiver.

10. The terminal of claim 9 wherein said first operational state is when said terminal is radio silent.

11. The terminal of claim 9 wherein said second state is a normal operational mode.

12. The terminal of claim 9 wherein said short range RF transceiver is a Bluetooth® transceiver and said short range RF device is a Bluetooth® device.

13. The terminal of claim 9 wherein said event is a transfer of data to or from said terminal.

14. The terminal of claim 9 wherein said event is activation of a reminder.

15. The terminal of claim 9 wherein said event is to synchronize a clock in said terminal with timing information available in a mobile communication network to which said terminal connects to when entering said second operational state.

16. The terminal of claim 9 wherein said event is to scan and store available broadcast radio stations.

17. An apparatus comprising
    a controller; and
    a memory coupled to the controller, the memory having program instructions stored thereon, the program instructions being configured to cause the controller to:
    receive scheduling information in a mobile communication terminal when the terminal is in a first operational state, the information specifying that an event in the mobile terminal is to be scheduled to be triggered when the mobile communication terminal has entered a second operational state; and
    trigger the event when the mobile communication terminal has entered the second operational state wherein said first operational state is when at least one untrusted short range RF device is within range for a short range RF transceiver in said terminal, and said second operational state is when only trusted short range RF devices are within range for said short range RF transceiver.

18. The apparatus according to claim 17, wherein the first operational state is when the terminal is radio silent and the second state is a normal operational mode.

* * * * *

UNITED STATES PATENT AND TRADEMARK OFFICE
CERTIFICATE OF CORRECTION

PATENT NO. : 7,636,548 B2   Page 1 of 1
APPLICATION NO. : 11/073407
DATED : December 22, 2009
INVENTOR(S) : Kraft et al.

It is certified that error appears in the above-identified patent and that said Letters Patent is hereby corrected as shown below:

Title page, item (73); column 1, line 1 delete "FL" and insert --FI-- therefor.
Column 6, line 32 delete "comprising" and insert --comprising:-- therefor.

Signed and Sealed this

Thirteenth Day of July, 2010

David J. Kappos
*Director of the United States Patent and Trademark Office*